Patented June 26, 1934

1,964,000

UNITED STATES PATENT OFFICE 1,964,000

CATALYTIC HYDROGENATION PROCESS

Wilbur A. Lazier, Elmhurst, Del., assignor to E. I. du Pont de Nemours & Company, Wilmington, Del., a corporation of Delaware No Drawing. Application May 27, 1930, Serial No. 456,299

21 Claims. (Cl. 260—156)

This invention relates to catalytic processes, and more particularly to processes for the liquid and vapor phase hydrogenation of carbon compounds by means of metallic hydrogenating catalysts prepared by heating multiple chromates of hydrogenating metals and nitrogen bases to their spontaneous decomposition temperature and simultaneously or subsequently reducing the resulting composition.

Considerable work has been done in the field of catalytic chemistry with a view to developing efficient materials for the hydrogenation of such unsaturated compounds as the olefins, unsaturated fats and fatty acids, benzene and its derivatives, and a large number of other compounds containing unsaturated functions, such as the aldehydes, nitriles, amides, and heterocyclic unsaturated rings. Most of this work has been based upon the classical discovery of Sabatier that finely divided metallic nickel is capable of causing the union of hydrogen with these compounds. The method has been further expanded and supplemented by the work of Ipat'ev on the application of high pressures to these reactions.

Extensive research has been carried out heretofore with the result that several different methods for the preparation of hydrogenation catalysts have been developed, the most common of which involve the precipitation and reduction of nickel hydroxide or carbonate, reduction of nickel oxide prepared by ignition of the nitrate, anodic oxidation followed by reduction, heating to their decomposition temperature of certain organic salts of nickel, and electrochemical deposition of metallic nickel.

Furthermore, various methods of reduction have been proposed, ranging from the ordinary dry reduction with hydrogen to reduction in an inert liquid vehicle or in the presence of the oil or other substance undergoing hydrogenation.

As is well known, these catalysts have found extensive use in the commercial hydrogenation of fats, oils, and similar readily hydrogenated substances. I have found, however, that in general catalysts prepared by the above methods, although ordinarily suitable for the hydrogenation of fats and oils, may be entirely inadequate for the more difficult hydrogenation of such compounds as aldehydes, ketones, sugars, phenols, furfural and its derivatives, or benzene and pyridine and their homologues. Although many types of nickel catalysts have been used for various liquid or vapor phase hydrogenations, so far as I am aware, a catalyst prepared by heating a double chromate of a nitrogen base and a hydrogenating metal to its decomposition temperature, followed by reduction with hydrogen, has never been employed for the hydrogenation or dehydrogenation of organic compounds.

This invention, accordingly, has as an object to carry out catalytic processes by the use of highly efficient chromite catalysts. A further object is to provide a process for the hydrogenation of carbon compounds in either liquid or vapor phase by the use of highly efficient hydrogenating metal catalysts prepared by heating a multiple salt of a hydrogenating metal and a nitrogen base to its spontaneous decomposition temperature, followed by reduction. A still further object is to carry out the dehydrogenation of organic compounds capable of dehydrogenation employing this type of catalyst. It is a specific object to carry out the hydrogenation of organic compounds by the use of reduced chromite catalysts derived from double chromates of ammonia and a hydrogenating metal.

These objects are accomplished by the following invention, which, in its general aspects, comprises the employment in hydrogenations and dehydrogenations of catalysts prepared by heating a double chromate of a nitrogen base and a hydrogenating metal, such as one of the double ammonium chromates, to its spontaneous decomposition temperature and, thereby converting the chromate to a chromite. This conversion constitutes a species of reduction since the valence of the chromium atom has been changed from a higher to a lower value. This heating or ignition may be accompanied or followed respectively by the step of simultaneously or subsequently reducing the resulting chromite with hydrogen.

The following typical methods have been found suitable for the preparation of chromite catalysts according to the principles of my invention, but it is to be understood that the specific procedure disclosed is merely illustrative and may be varied within wide limits:

(1) Concentrated solutions of nickel chloride and neutral ammonium chromate are permitted to react at room temperature. Upon standing, a green crystalline salt of nickel ammonium chromate is formed. The solution is filtered with suction and the precipitate dried and heated slightly to start the decomposition reaction, which thereafter proceeds spontaneously with the evolution of sufficient heat to leave a glowing residue probably consisting of combined nickel oxide and chromium oxide. This composition may be subsequently further reduced with hydrogen to produce the desired catalyst.

(2) Two molar solutions of nickel nitrate and ammonium chromate are mixed in equivalent amounts and heated to boiling, whereupon a brick red precipitate of double nickel ammonium chromate is separated. Ammonia may be added to neutralize the acid solution formed by the precipitation and greatly improves the yield. As in method (1), the double ammonium compound is heated slightly to occasion spontaneous decomposition and the resulting ignited product may be further reduced with hydrogen.

It seems desirable at this point to discuss briefly the chemistry of the catalytic materials comprising the subject matter of this invention. The finished catalyst, when prepared as hereinabove disclosed, may be said to consist of a hydrogenating metal and an oxide of the hydrogenating metal, associated or combined with, or supported upon, chromium oxide ($Cr_2O_3$). By the term hydrogenating metal, I refer to a metal which is capable of causing the union of hydrogen with a carbon compound capable of hydrogenation, with or without the splitting off of water. Included in this group of metals are iron, nickel, cobalt, copper, silver and tin. It is to noted that these metals are not only capable of inducing hydrogenation, but also have dehydrogenating propensities under certain conditions of operation.

I have disclosed above the preparation of chromite catalysts by the spontaneous decomposition and reduction of double nickel ammonium chromate, which may be considered typical of the class of salts which I have described as multiple salts of hydrogenating metals and nitrogen bases. By the term nitrogen base, I include, besides ammonium compounds, organic derivatives such as salts of pyridine, aniline and methylamine. When heated, these organic derivatives behave in a manner similar to the ammonium derivatives and yield chromites, which, upon reduction, possess the same catalytic properties.

With regard to the double ammonium compounds, it may be said that various formulae have been assigned to these double salts by investigators. Cold concentrated solutions of nickel chloride and ammonium chromate yield a green salt to which investigators have assigned the formula $(NH_4)_2Ni(CrO_4)_2 \cdot 6H_2O$, while more dilute solutions at higher temperatures give rise to the formation of a brick red precipitate probably having the formula $(NH_4)_2Ni(CrO_4)_2 \cdot 2NH_3$. Both of these compounds decompose spontaneously on heating and yield a product in which chromium is present in the trivalent form.

When prepared by method (1) or (2), the nickel chromate is first converted to a nickel chromite composition which may be considered to consist of nickel oxide (NiO) and nickel chromite ($NiCr_2O_4$) in which the chromium is in the trivalent form. This composition may be then further reduced to a composition consisting of metallic nickel, nickel oxide and nickel chromite. In order to classify these compositions under a generic term regardless of their method of preparation, they may be designated as nickel-chromium oxide catalysts or nickel chromites. However, by the term chromite I do not intend to define these compositions as definite chemical compounds, but as compositions in which the catalytically active component is a hydrogenating metal which may be either combined or associated with chromium in a lower state of oxidation. The hydrogenating metal may exist, either in the metallic form, or as an oxide, or both, the chemical relationships of the various elements in the composition depending to a certain extent upon the methods of preparation and reduction employed.

The nitrogen base compounds, typified by nickel ammonium chromate, are preferably heated slowly to start the reaction, after which they decompose spontaneously leaving a residue of nickel chromite. The spontaneous decomposition temperature will vary for the different compounds, but in general, it may be said to be from 200–400° C. Reduction of the resulting composition may be carried out at 400–600° C., preferably at 500° C.

The methods described above are equally applicable to the preparation of chromites of hydrogenating metals other than nickel, for example, other members of the ferrous group, such as those of iron and cobalt. Tin ammonium chromate may be prepared by treating a solution of stannous chloride and strong hydrochloric acid with ammonium bichromate and neutralizing the mixture with ammonia. After reduction, the tin-chromium oxide complex becomes active for the hydrogenation of such compounds as nitrobenzene.

Similarly, a very active copper chromite preparation is formed by the interaction of equimolecular proportions of copper nitrate and normal ammonium chromate solutions, followed by ignition and reduction of the precipitate. Basic copper ammonium chromate is formed by the precipitation, which yields a complex mixture of copper oxide and copper chromite on ignition. Reduction yields a part of the copper in the active elementary form.

The proposed methods of catalyst preparation have several advantages. Not only is the catalyst extremely active in hydrogenation reactions, but it is also capable of withstanding catalyst poisons, such as oxygen, and sulphur. This is presumably because of the potential supply of unreduced hydrogenating metal which may be continuously activated under the conditions of hydrogenation. When badly poisoned, the chromium oxide component of the catalyst facilitates regeneration, which is brought about by gentle ignition followed by reduction. Another advantage is that the materials of this invention lend themselves very readily to compression into a form which may be used in a continuous operation wherein the liquid or vapor to be hydrogenated is permitted to flow over the contact mass in the presence of hydrogen under pressure. Nickel and copper chromites are, for example, readily briquetted with the ordinary types of pharmaceutical tablet machinery without injury to the porosity or activity of the catalyst. It will be apparent that a continuous method of operation, using the catalysts of this invention, offers many advantages over the usual autoclave process.

Having outlined above the general principles of the invention, the following examples of the application of the catalytic materials herein described to particular reactions are included merely for purposes of illustration and not as a limitation.

*Example 1.*—A copper-chromium oxide catalyst was prepared by igniting basic copper ammonium chromate at 400° C. and reducing the resulting copper chromite in hydrogen at 300–350° C. for four hours. 5 grams of the catalyst was shaken with 300 grams of nitrobenzene at 150° C. under a hydrogen pressure of 1800 pounds. Aniline was formed quantitatively, the reaction being completed after three hours.

*Example 2.*—Copper chromite prepared as described in Example 1 was compressed into suitable tablets and reduced as indicated above. 100 cc. of the granular catalyst was then loaded into a pressure resisting tube and crude synthetic butanol, containing such unsaturated alcohols as crotonyl alcohol and esters of both butanol and crotonyl alcohol, was pumped continuously over the catalyst at the rate of 500 cc. per hour at a temperature of 200° C. and under a hydrogen pressure of 1500 pounds. The butanol was probably not completely vaporized under these conditions, but flowed down over the catalyst while the flow of hydrogen was maintained through the mass. Gas and liquid were separated under pressure and drawn off continuously. The iodine number of the crude butanol decreased from 50 to 5 with a resultant improvement in the odor and usefulness of the product.

*Example 3.*—A catalyst comprising reduced nickel supported upon and partially combined with chromium oxide was prepared by reducing with hydrogen at 400° C. the green double salt of nickel and ammonia having the probable formula $(NH_4)_2Ni(CrO_4)_2.6H_2O$. 5 grams of the reduced catalyst was added to 200 cc. of commercial acetone which was then heated to a temperature of 100° C. with hydrogen at a pressure of 400 pounds. With moderate agitation hydrogen was rapidly absorbed with the formation of pure isopropanol.

*Example 4.*—1750 grams of nickel nitrate were dissolved in three liters of water and mixed with a solution of 750 grams of ammonium bichromate in an equal volume of water. The mixed solution was heated to 90–100° C. for 30 minutes with stirring, after which the brick red precipitate formed was washed by decantation and dried. By analysis, the dried product contained 6.7% ammonia and 26.6% nickel and consisted of a complex double chromate of ammonia and nickel. This compound was ignited at 400° C. to drive off the ammonia and part of the oxygen and then reduced for 12 hours in a stream of dry hydrogen at 500° C.

Two grams of the reduced nickel-nickel chromite composition were added to 200 cc. of crude synthetic higher alcohol boiling at 100–135° C. prepared by the high pressure dehydrogenation of ethanol. This oil contained, besides butanol, a quantity of unsaturated bodies such as crotonyl alcohol and esters such as butyl acetate and ethyl butyrate. After vigorously agitating the mixture for 30 minutes at 120–170° C. under a hydrogen pressure of 200 pounds, the iodine number of the oil was found to have been reduced from about 100 to about 3, with a resulting improvement in the quality of the higher alcohol and ester mixture for solvent purposes.

Athough in the above examples I have indicated certain definite conditions of temperature, pressure, gas velocity, amounts of materials, duration of reactions, etc., it is to be understood that any and all of these may be varied widely within the scope of my invention, since the particular conditions of operation are governed largely by the specific reaction catalyzed, the materials treated, and the catalyst selected for a given reaction.

It will be apparent from the examples given that the catalysts of my invention have many valuable applications. Although I have described their use in certain selected liquid and vapor phase hydrogenations which illustrate their particularly advantageous properties, they are capable of use in many other types of hydrogenations as well as in dehydrogenations, in both liquid and vapor phase. In this connection, it may be said that many organic hydrogenation reactions reach an equilibrium in which the product of hydrogenation, unless continuously removed from the reaction zone, undergoes dehydrogenation. In this type of reaction there are present three components, namely, a compound capable of hydrogenation, a compound capable of dehydrogenation, and hydrogen. The catalysts of my invention are not only effective in causing the reaction to proceed in the direction of hydrogenation, but also under the proper conditions, to induce dehydrogenation.

So much of this application as relates to the hydrogenation of unsaturated heterocyclic compounds is claimed in my co-pending applications Serial Nos. 712,841 and 712,842 filed February 24, 1934.

As many apparently and widely different embodiments of this invention may be made without departing from the spirit and scope thereof, it is to be understood that I do not limit myself to the specific embodiments thereof except as defined in the appended claims.

I claim:

1. In the process of hydrogenating a carbon compound capable of hydrogenation, the step which comprises bringing a mixture of said compound and hydrogen under pressure into contact with a catalyst prepared by heating a multiple chromate of a nitrogen base and a hydrogenating metal to its spontaneous decomposition temperature and thereafter reducing the resulting composition in hydrogen.

2. The process of claim 1 in which the carbon compound is an unsaturated organic compound.

3. The process of claim 1 in which the chromate is a compound prepared by precipitating the chromate of a hydrogenating metal in the presence of ammonium hydroxide.

4. The process of claim 1 in which the catalyst is a chromite prepared by heating the compound resulting from the precipitation of nickel chromate in the presence of ammonium hydroxide to its spontaneous decomposition temperature, and thereafter reducing the resulting composition in hydrogen.

5. In the process of hydrogenating crude synthetic butyl alcohol prepared by the catalytic dehydrogenation of ethanol and containing unsaturated compounds as crotonyl alcohol, butyl acetate, and ethyl butyrate, the step which comprises agitating a mixture of said butyl alcohol and hydrogen at a pressure of about 200 pounds and at a temperature of 120–170° C. in the presence of a catalyst prepared by heating the composition resulting from the precipitation of nickel chromate in the presence of ammonium hydroxide to its spontaneous decomposition temperature, and reducing the resulting composition in a stream of hydrogen at about 500° C. to a form which contains metallic nickel, nickel oxide, and nickel chromite.

6. The process described in claim 1 in which the carbon compound is maintained in the liquid state during the hydrogenation reaction.

7. The process described in claim 1 in which the carbon compound is an organic compound.

8. The process described in claim 1 in which the carbon compound is an organic compound and is maintained in the liquid state during the hydrogenation reaction.

9. The process described in claim 1 in which the hydrogenating metal is copper.

10. A process of hydrogenating organic compounds which comprises bringing a mixture of an organic compound capable of hydrogenation and hydrogen under pressure into contact with a catalyst prepared by heating a multiple chromate of a nitrogen base and copper to its spontaneous decomposition temperature and thereafter reducing the resulting composition in hydrogen.

11. The process described in claim 10 in which the chromate is prepared by precipitating copper chromate in the presence of ammonium hydroxide.

12. A process of hydrogenating an organic compound capable of hydrogenation which comprises reacting a mixture of such compound in the liquid state and hydrogen under pressure in the presence of a catalyst prepared by partially reducing a multiple chromate of a nitrogen base and a hydrogenating metal.

13. The process described in claim 12 in which the catalyst referred to is prepared by partial reduction of a multiple chromate of a nitrogen base and copper.

14. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by heating nickel ammonium chromate to form nickel chromite, and then reducing said chromite prior to suspending the catalyst in said oil.

15. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by heating a compound corresponding substantially to the empirical formula $Ni_2O(NH_4)_2(CrO_4)_2$ to form nickel chromite, and reducing said chromite with a gaseous reducing agent prior to suspending the catalyst in said oil.

16. The method of making a catalyst for hydrogenation of fatty oils in the liquid phase and composed of metallic nickel intimately associated with and adherently supported on chromium oxide, comprising reacting a water soluble nickel salt, a chromium compound of the group consisting of chromic acid and alkali metal chromates, and ammonia to thereby precipitate nickel ammonium chromate, heating said chromate to convert it to nickel chromite, and reducing said chromite at an elevated temperature with a gaseous reducing agent.

17. A method of making a catalyst for hydrogenation of unsaturated fatty oils in the liquid phase composed of metallic nickel intimately associated with and adherently supported on chromium oxide, comprising reacting, in concentrated solution, a water soluble nickel salt, chromic acid, and ammonia, in proportions adapted to precipitate a compound having substantially the formula $Ni_2O(NH_4)_2(CrO_4)_2$, heating said precipitate to about 350° C. to convert it to nickel chromite, and reducing said chromite in hydrogen at a temperature of about 500° C.

18. A method of making a catalyst for hydrogenation of unsaturated fatty oils in the liquid phase and composed of metallic nickel intimately associated with and adherently supported on chromium oxide, comprising reacting a water soluble nickel salt, ammonia, and a water soluble chromium compound capable of reacting with said nickel salt to form nickel chromate to thereby precipitate nickel ammonium chromate, heating said chromate up to about 350° C. to convert it to nickel chromite, and then reducing said chromite at an elevated temperature in the gaseous phase with hydrogen.

19. The process described in claim 1, in which the hydrogenating metal is nickel.

20. The process described in claim 12, in which the catalyst referred to is prepared by partial reduction of a multiple chromate of a nitrogen base and nickel.

21. The process described in claim 1, in which the carbon compound is maintained in the liquid state during the hydrogenation reaction and in which the hydrogenating metal is nickel.

WILBUR A. LAZIER.